(12) United States Patent
Yasuhara et al.

(10) Patent No.: US 7,469,956 B2
(45) Date of Patent: Dec. 30, 2008

(54) AUTOMOBILE FRONT BODY STRUCTURE

(75) Inventors: Shigeto Yasuhara, Wako (JP); Akihisa Kudoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 11/621,234

(22) Filed: Jan. 9, 2007

(65) Prior Publication Data
US 2007/0176443 A1 Aug. 2, 2007

(30) Foreign Application Priority Data
Jan. 17, 2006 (JP) .............................. 2006-008923

(51) Int. Cl.
*B60R 19/34* (2006.01)
(52) U.S. Cl. .................. 296/187.09; 293/133
(58) Field of Classification Search ............ 296/187.03, 296/187.09, 187.1, 193.09, 203.03; 293/132, 293/133, 154, 155
See application file for complete search history.

(56) References Cited

U.S. PATENT DOCUMENTS

| 6,705,670 | B2 * | 3/2004 | Forssell et al. ......... 296/187.09 |
| 7,296,824 | B2 * | 11/2007 | Yasui et al. .................. 280/784 |
| 2001/0002761 | A1 * | 6/2001 | Tsuruta et al. .............. 296/189 |
| 2005/0077711 | A1 * | 4/2005 | Yasui et al. .................. 280/735 |
| 2007/0252412 | A1 * | 11/2007 | Yatsuda ................. 296/193.09 |
| 2008/0012386 | A1 * | 1/2008 | Kano et al. ............ 296/187.03 |

FOREIGN PATENT DOCUMENTS

JP 2005-112173 4/2005

* cited by examiner

Primary Examiner—Lori L Lyjak
(74) Attorney, Agent, or Firm—Rankin, Hill & Clark LLP

(57) ABSTRACT

An automobile front body structure including a front side frame and a lower frame. A front end of the front side frame and a front end of the lower frame are arranged in parallel in the direction of the vehicle width and are connected to one another.

6 Claims, 8 Drawing Sheets

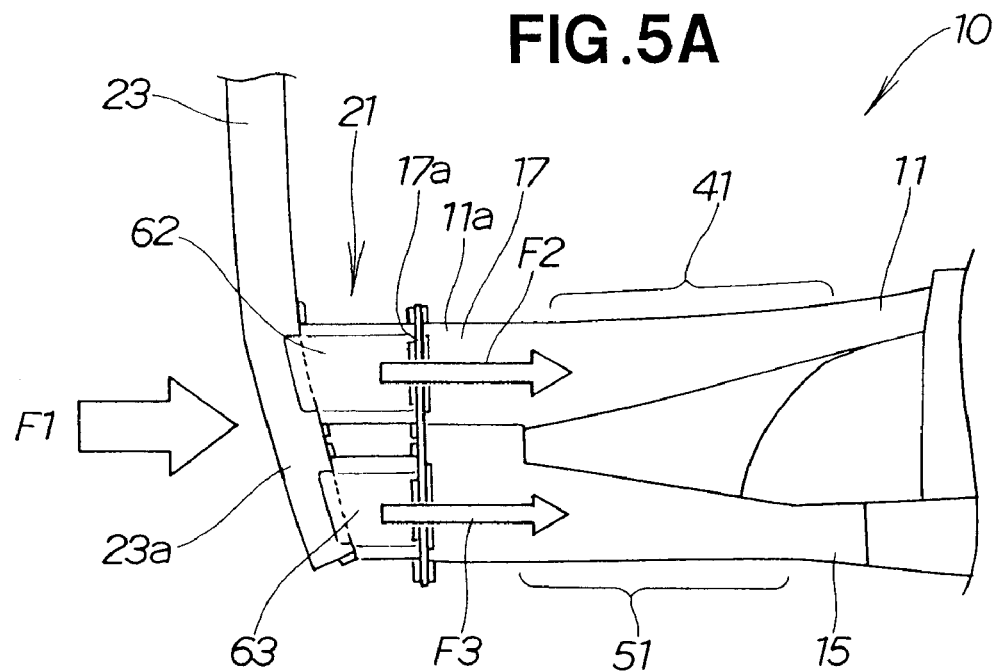
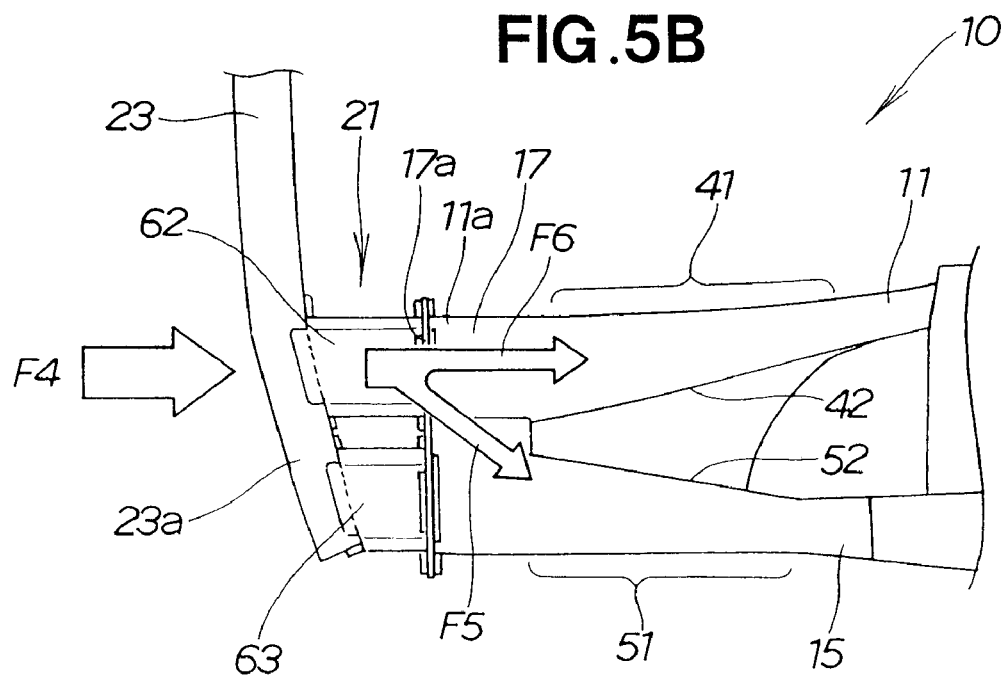

AUTOMOBILE FRONT BODY STRUCTURE

FIELD OF THE INVENTION

The present invention relates to an automobile front body structure having a lower frame on the outside of the front side frame as viewed in the width direction of the vehicle.

BACKGROUND OF THE INVENTION

Japanese Patent Laid-Open Publication No. 2005-112173 (JP 2005-112173 A) teaches an automobile front body structure provided with a front side frame that extends in the longitudinal direction of the vehicle body, and a lower frame that is disposed on the exterior thereof and extends to the edge of a wheel housing. The front body structure will be described with reference to FIG. 8 hereof. FIG. 8 is a top plan view showing a portion of the front body structure.

A front body structure 200 has a front side frame 201 that extends in the longitudinal direction of the vehicle. The rear end of the front side frame 201 is fixed to the bottom edge of a wheel housing 202. The front end 201a of the front side frame 201 is provided with an impact absorbing member 203.

A front pillar (not shown) is disposed above the rear part of the front side frame 201. A lower frame 204 extends from the bottom end of the front pillar toward the front of the vehicle body. The lower frame 204 is disposed on the outside of the front side frame 201, as viewed in the width direction of the vehicle.

The substantially central part of the lower frame 204 is formed so as to reach the upper surface of the wheel housing 202. The front end 204a of the lower frame 204 is connected to the front end 201a of the front side frame 201 via a connecting member 206.

The front end 204a of the lower frame 204 and the front end 201a of the front side frame 201 extend parallel to each other. Therefore, the connecting member 206 must be disposed so as to be orthogonal to the front side frame 201 and the lower frame 204 in order to connect the front ends 201a, 204a via the connecting member 206.

When a relatively small load Fa is applied to the front surface of the impact absorbing member 203 in the front body structure 200, as indicated by the arrow, a portion of the load Fa is absorbed by the impact absorbing member 203. The remainder of the load is dispersed as loads Fb and Fc to the front side frame 201 and the lower frame 204 via the connecting member 206.

The connecting member 206 is disposed so as to be orthogonal to the front side frame 201 and the lower frame 204. The transmission direction varies considerably, as indicated by the arrow, when the load Fc is transmitted from the front side frame 201 to the connecting member 206. The transmission direction varies considerably, as indicated by the arrow, when the load Fc that has been transmitted to the connecting member 206 is transmitted further to the lower frame 204 from the connecting member 206. Therefore, the remainder of the load must be temporarily supported by the front side frame 201, and the rigidity of the front side frame 201 is set high.

Setting the rigidity of the front side frame 201 to a high level is thus an obstacle to reducing the weight of the front body structure 200, and there is room for improvement in this respect.

SUMMARY OF THE INVENTION

An object of the present invention is to provide a front body structure for an automobile in which a reduction in weight can be achieved.

According to the present invention, there is provided an automobile front body structure comprising: a front side frame extending in the longitudinal direction of a vehicle body; a front pillar disposed above the rear part of the front side frame; and a lower frame that extends from a bottom end of the front pillar toward the front of the vehicle body, and that is disposed on the outside of the front side frame as viewed in the width direction of the vehicle, wherein a front end of the front side frame and a front end of the lower frame are arranged in parallel in the width direction of the vehicle, and the front ends are connected to each other.

The front ends can thus be disposed in close proximity by directly connecting the front end of the front side frame and the front end of the lower frame. Disposing the front ends in close proximity makes it possible to gradually reduce the interval between the front side frame and the lower frame can toward the front of the vehicle. Specifically, the front side frame and lower frame form a substantial V-shape from the front end toward the rear. Accordingly, when a load is applied to the front surface of the front side frame, a portion of the load is transmitted to the lower frame without a dramatic variation in the transmission direction. A portion of the load is thereby efficiently transmitted to the lower arm, and the load transmitted to the front side frame can be reduced. An advantage is therefore achieved whereby it is not necessary to increase the rigidity of the front side frame more than necessary, and the weight can be reduced.

In the front body structure, preferably, an oblong part extending in the widthwise direction of the vehicle is formed using the connected front ends; an impact absorber is provided along the entire front surface area of the oblong part; and a bumper beam is attached to the impact absorber.

The front ends of the front side frames disposed on the left and right sides of the front body structure of the automobile are normally connected by a reinforcement member, whereby the rigidity of the left and right front side frames can be ensured. In the present invention, the front ends of the front side frame and the lower frame form an oblong member, and an impact absorber is disposed at the front surface of this position. Both ends of a bumper beam are attached to the impact absorber, whereby both ends of the impact absorber provided to the left and right side of the vehicle body are connected by the bumper beam. This arrangement enables the bumper beam to serve as the reinforcement member. In other words, the forming of the impact absorber into an oblong shape prevents bending thereof in the transverse direction (width direction of the vehicle), and enables rigidity to be increased. The bumper beam is thereby attached to the impact absorber, whereby the bumper beam can be used as the reinforcement member of the front side frame and the lower frame. The bumper beam thus acts as the reinforcement member of the front side frame and the lower frame, whereby the reinforcement member that is ordinarily used can be removed to reduce weight.

Preferably, the impact absorber comprises a mounting plate that is attached by bolts to the entire front surface of the oblong part; a side frame impact absorbing member attached to the mounting plate and disposed on the front of the front side frame; and a lower frame absorbing member attached to the mounting plate and disposed on the front of the lower frame. An assembly having the mounting plate, the side frame impact absorbing member, and the lower frame impact absorbing member is attached by a plurality of bolts to the front surface of the oblong part. Therefore, with the impact absorber incorporated into the assembly, and the assembly attached by bolts, an advantage is presented in that the impact absorber can be readily attached to the front surface of the oblong part without intensive labor.

Desirably, in the front body structure, the opposing side surfaces of the front side frame and the lower frame are inclined at an angle of θ1 and θ2. The front side frame and the lower frame increase in width so as to come closer to each other toward the front ends thereof, and are connected at the front ends thereof. Since the two frames can be directly connected without a separate connecting member, the load applied to the front side frame accordingly can be dispersed in an efficient manner. In particular, the load applied to the middle portion of the front ends of either frame will be dispersed to the frames.

BRIEF DESCRIPTION OF THE DRAWINGS

Certain preferred embodiments of the present invention will be described in detail below, by way of example only, with reference to the accompanying drawings, in which:

FIGS. 5A and 5B are diagrams showing a state in which a load is applied to the front body structure of the first embodiment;

DESCRIPTION OF THE PREFERRED EMBODIMENTS

Reference is initially made to FIGS. 1 to 5 showing an automobile front body structure according to a first embodiment of the present invention.

Figure 1:
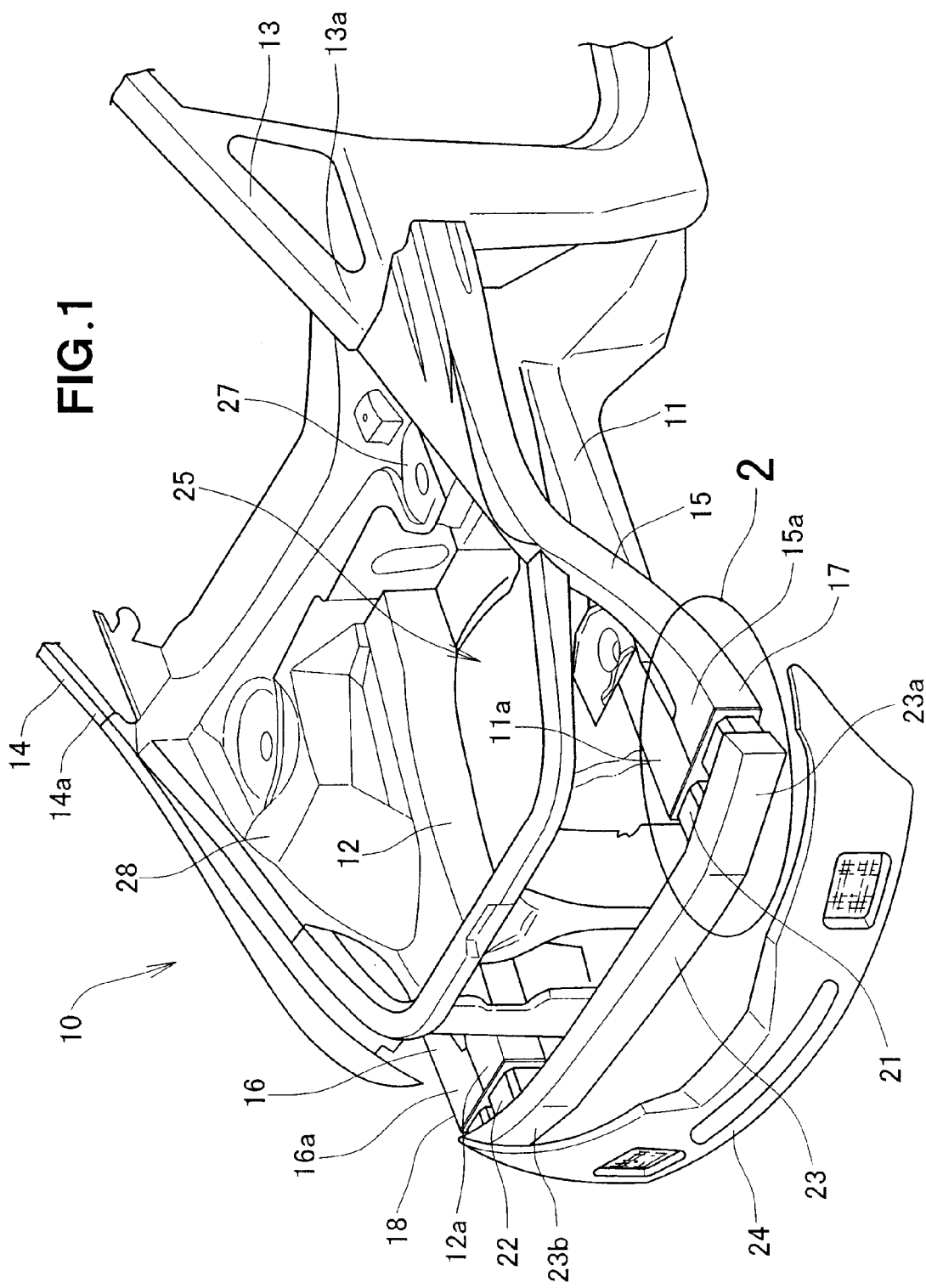
FIG. 1 is a perspective view showing the automobile front body structure of a first embodiment according to the present invention.

As shown in FIG. 1, an automobile front body structure 10 includes left and right front side frames 11, 12 on the left and right sides of the front portion of the vehicle body. A left front pillar 13 is disposed above and to the rear of the left front side frame 11. A left lower frame 15 extends frontward from a bottom end 13a of the left front pillar 13, and is disposed on the outside of the left front side frame 11, as viewed from the width direction of the vehicle. A right front pillar 14 is disposed above and to the rear of the right front side frame 12. A right lower frame 16 extends frontward from the bottom end 14a of the right front pillar 14, and is disposed on the outside of the right front side frame 12, as viewed from the width direction of the vehicle.

A left wheel housing 27 that covers a left front wheel (not shown) is disposed between the left front side frame 11 and the left lower frame 15. A right wheel housing 28 that covers a right front wheel is disposed between the right front side frame 12 and the right lower frame 16.

A front end 11a of the left front side frame 11 and a front end 15a of the left lower frame 15 are disposed so as to be parallel to each other in the width direction of the vehicle. The front ends 11a, 15a are fitted together and connected to form a left oblong part 17. A front end 12a of the right front side frame 12 and a front end 16a of the right lower frame 16 are disposed so as to be parallel to each other in the width direction of the vehicle. The front ends 12a, 16a are fitted together and connected to form a right oblong part 18.

A left impact absorber 21 is disposed along the entire area of a front surface 17a of the left oblong part 17. A right impact absorber 22 is disposed along the entire area of a front surface 18a of the right oblong part 18. A bumper beam 23 is mounted between the left and right impact absorbers 21, 22. A front bumper 24 is attached to the bumper beam 23. Specifically, a left end 23a of the bumper beam 23 is attached to the left impact absorber 21, and a right end 23b is attached to the right impact absorber 22.

An engine compartment 25 is formed by the left and right front side frames 11, 12, the left and right lower frames 15, 16, and the bumper beam 23.

The left and right front side frames 11, 12, the left and right lower frames 15, 16, and the left and right impact absorbers 21, 22 are members that have left-right symmetry with respect to each other. A description is given below of the left front side frame 11, the left lower frame 15, and the left impact absorber 21; and a description of the right front side frame 12, the right lower frame 16, and the right impact absorber 22 is omitted.

Figure 2:
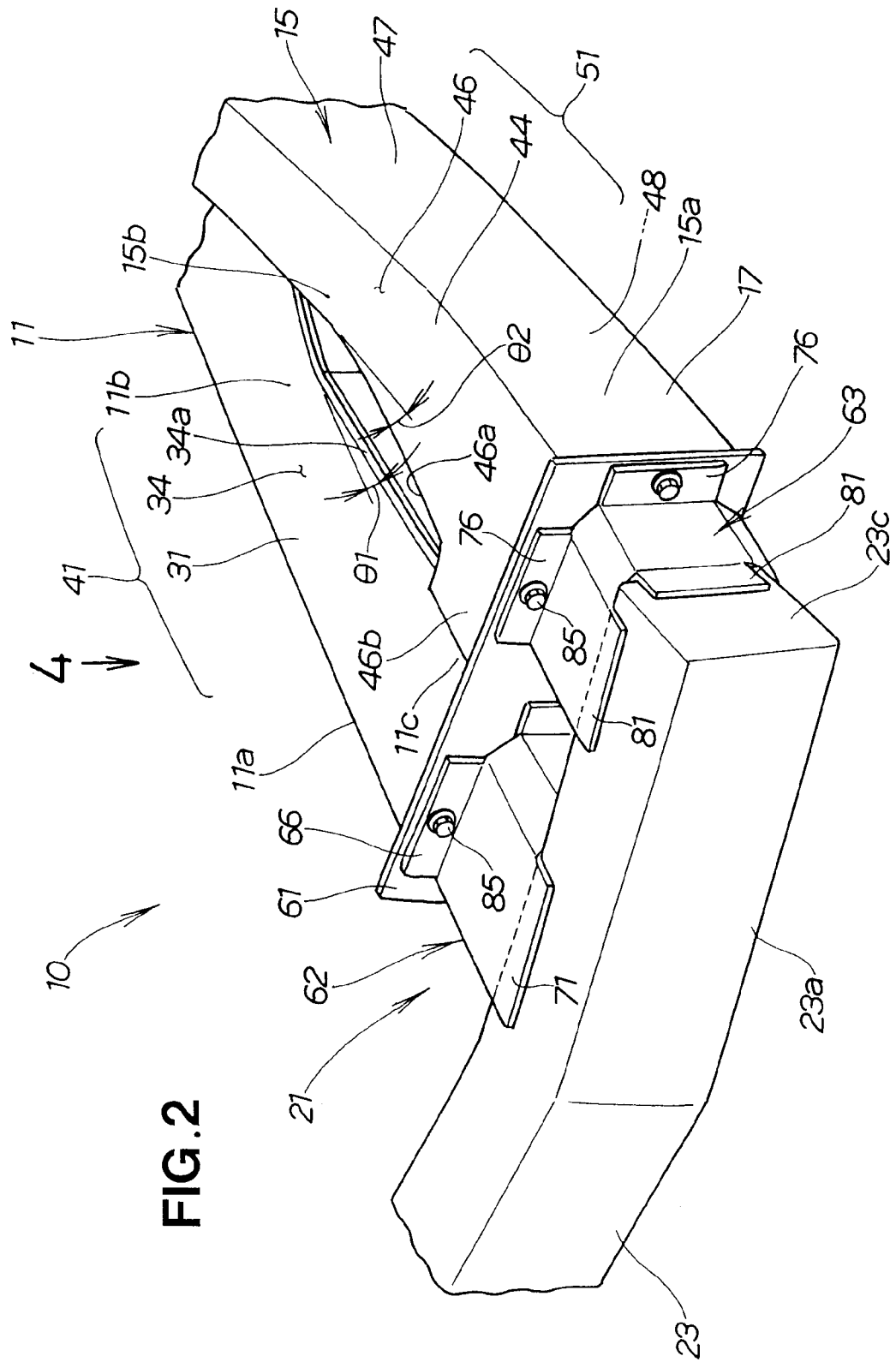
FIG. 2 is an enlarged view of area 2 in FIG. 1.
Figure 3:
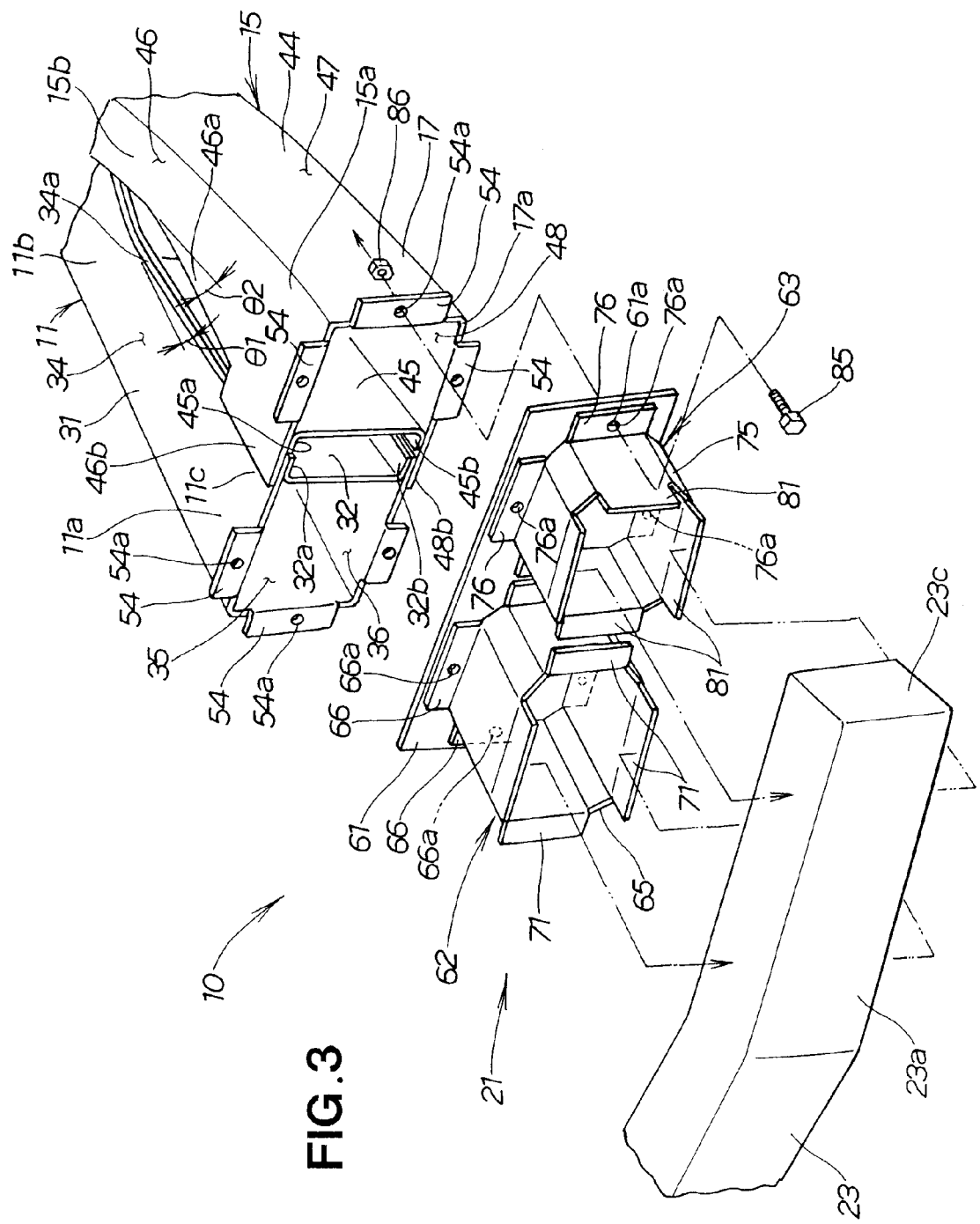
FIG. 3 is an exploded perspective view of the front body structure shown in FIG. 2.
Figure 4:
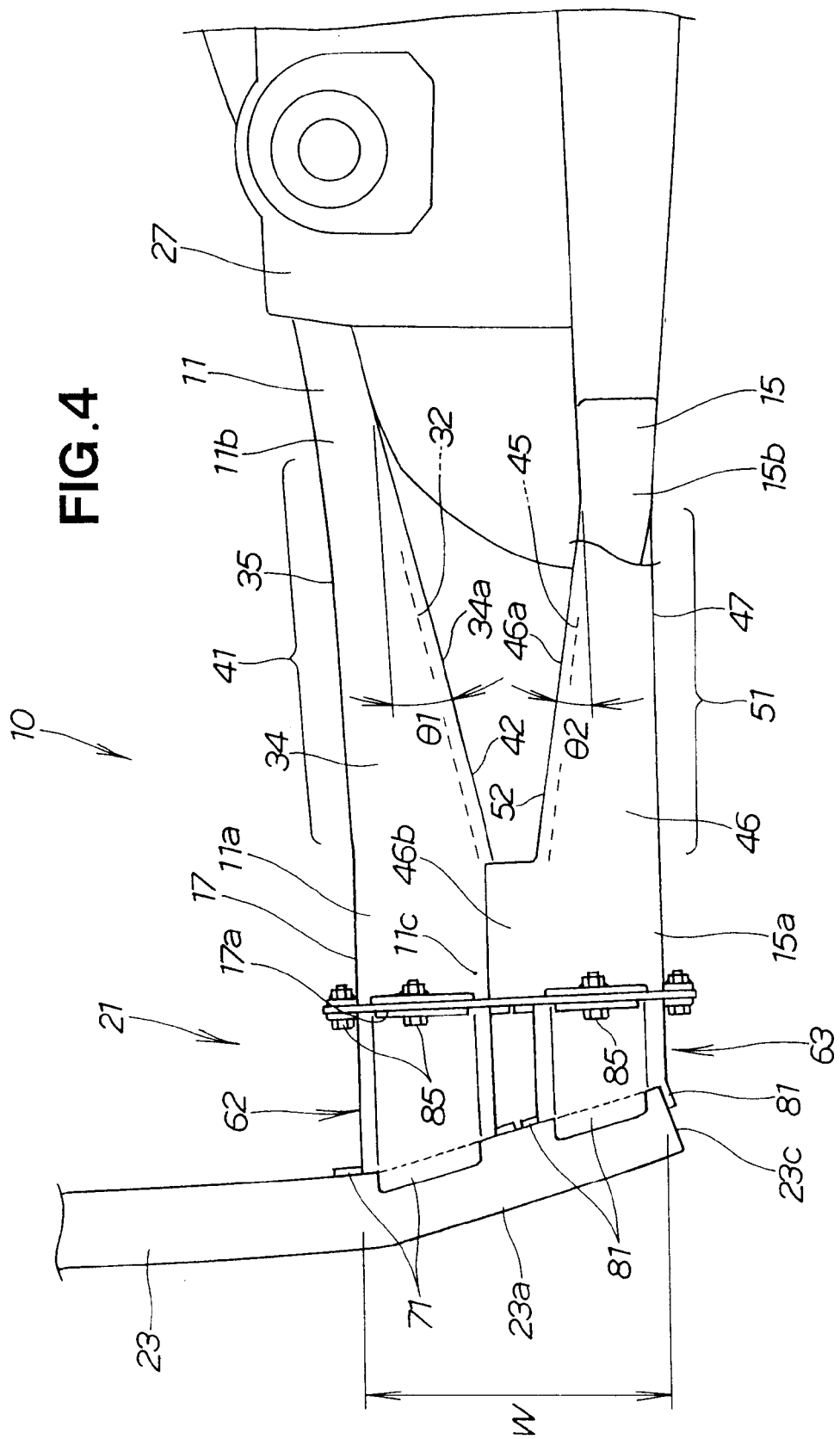
FIG. 4 is a view along the arrow 4 in FIG. 2.

In reference to FIGS. 2 to 4, the left front side frame 11 has a side frame member 31 that extends in the longitudinal direction of the vehicle body, and is substantially U-shaped in cross-section with the open part thereof facing the outside of the vehicle body; and a side reinforcement member 32 that is substantially U-shaped in cross-section and fits into the open part of the side frame member 31.

The side frame member 31 has a top wall part 34 that extends horizontally in the width direction of the vehicle; a longitudinal wall part 35 that extends downward from the inner side of the top wall part 34; and a bottom wall part 36 that extends from a bottom side of the longitudinal wall part 35 toward the outside as viewed in the width direction of the vehicle.

An outer side 34a of the top wall part 34 gradually slants toward the outside of the vehicle body (on the left lower frame 15 side) from the substantially central part 11b in the longitudinal direction of the left front side frame 11 to the front end 11a. The angle of incline is θ1. Accordingly, the width of the top wall part 34 gradually increases from the substantially central part 11b toward the front end 11a. As with the top wall part 34, the outer side of the bottom wall part 36 gradually slants from the substantially central part toward the front end at an angle of inclination θ1 heading to the outside of the vehicle body.

An upper bent piece 32a of the side reinforcement member 32 extends along the outer side 34a of the top wall part 34 of the side frame member 31, and is spot-welded or otherwise fixed in place in the general vicinity of the outer side 34a.

A lower bent piece 32b of the side reinforcement member 32 extends along the outer side of the bottom wall 36, and is spot-welded or otherwise fixed in place in the general vicinity of the outer side.

The side reinforcement member 32 gradually slants from the substantially central part 11b toward the front end 11a at an angle of inclination of θ1, heading toward the outside of the vehicle (left lower frame 15 side).

The portion of the left front side frame 11 from the substantially central part 11b to the front end 11a is described below as the side slanted part 41.

The left lower frame 15 has a lower frame member 44 that extends in the longitudinal direction of the vehicle body, and is substantially U-shaped in cross-section with the open part thereof facing the inside of the vehicle body; and a lower reinforcement member 45 is substantially U-shaped in cross-section and fits into the open part of the lower frame member 44.

The lower frame member 44 has a top wall part 46 that extends horizontally in the width direction of the vehicle; a longitudinal wall part 47 that extends downward from the outer side of the top wall part 46; and a bottom wall part 48 that extends from a bottom side of the longitudinal wall part 47 toward the inside in the width direction of the vehicle.

An inner side 46a of the top wall part 46 gradually slants toward the inside of the vehicle from the substantially central part 15b in the lengthwise direction toward the front end 15a at an angle of inclination of θ2. Accordingly, the width of the top wall part 46 gradually increases from the substantially central part 15b toward the front end 15a.

As with the top wall part 46, the inner side of the bottom wall part 48 gradually slants from the substantially central part toward the front end at an angle of inclination of θ2, heading toward the inner side of the vehicle body.

An upper bent piece 45a of the lower reinforcement member 45 extends along an inner side 46a of the top wall part 46, and is spot-welded or otherwise fixed in place in the general vicinity of the inner side 46a. A lower bent piece 45b of the lower reinforcement member 45 extends along an inner side of the bottom wall part 48, and is spot-welded or otherwise fixed in place in the general vicinity of the inner side.

The lower reinforcement member 45 gradually slants from the substantially central part 15b toward the front end 15a at an angle of inclination of θ2, heading toward the inside of the vehicle body (left front side frame 11 side).

The portion of the left lower frame 15 from the substantially central part 15b to the front end 15a is described below as the lower slanted part 51.

The side slanted part 41 is thus slanted at an angle of inclination of θ1 and the lower slanted part 51 is slanted at an angle of inclination of θ2, whereby the side frame front end 11a and the lower frame front end 15a are disposed so as to be directly connected.

The left lower frame 15 has in the lower frame front end 15a an upper overlapping part 46b in which the inner side 46a of the top wall part 46 protrudes farther toward the inside of the vehicle body than the upper bent piece 45a; and a lower overlapping part 48b in which the inner side of the bottom wall part 48 protrudes farther toward the inside of the vehicle than the lower bent piece 45b.

The upper and lower overlapping parts 46b, 48b of the lower frame front end 15a fit in a outer side area 11c of the side frame front end 11a, and are spot-welded or otherwise fixed in place in the outer side area 11c. The side frame front end 11a and the lower frame front end 15a are thereby solidly connected, and the left oblong part 17 extending in the width direction of the vehicle is rigidly fixed.

Upper mounting pieces 54, 54 that protrude upward are formed on the front end of the top wall part 34 of the side frame member 31 and the front end of the top wall part 46 of the lower frame member 44. Lower mounting pieces 54, 54 that protrude downward are formed on the front end of the bottom wall part 36 of the side frame member 31 and the front end of the bottom wall part 46 of the lower frame member 44. Side mounting pieces 54, 54 that protrude toward the inside and the outside of the vehicle body are formed on the front end of the longitudinal wall part 35 of the side frame member 31 and the front end of the longitudinal wall part 47 of the lower frame member 44. The mounting pieces 54 have mounting holes 54a.

The left impact absorber 21 is provided with a rectangular mounting plate (plate member) 61 attached by bolts to the front surface 17a of the left oblong part 17; and a side frame impact absorbing member 62 and a lower frame impact absorbing member 63 attached to the mounting plate. Mounting holes 61a, 61a are formed in the periphery of the mounting plate 61.

The mounting plate 61 is disposed on the front surface 17a of the left oblong part 17. In this state, the upper mounting holes 61a, 61a of the mounting plate 61 are aligned with the upper mounting holes 54a, 54a of the left oblong part 17, the lower mounting holes 61a, 61a are aligned with the lower mounting holes 54a, 54a of the left oblong part 17, and the side mounting holes 61a, 61a are aligned with the side mounting holes 54a, 54a of the left oblong part 17.

The side frame impact absorbing member 62 is provided with a substantially rectangular tube 65. The corners of the tube 65 are tapered. The tube 65 has rear bent pieces 66, 66 formed above and below and to either side of the rear end thereof; front extension pieces 71, 71 are formed above and below the front end; and front bent pieces 71, 71 are formed on either sides of the front end. The upper and lower and right rear bent pieces 66 have mounting holes 66a.

The mounting holes 61a formed above and below and to the right side of the mounting plate 61 align with the mounting holes 66a formed on the rear bent pieces 66 above, below and to the right of the side frame impact absorbing member 62, and the side frame impact absorbing member 62 is spot welded or otherwise attached to the mounting plate 61. Therefore, the side frame impact absorbing member 62 is attached to the right half position of the mounting plate 61, corresponding to the location of the front end 11a of the left front side frame 11.

The lower frame impact absorbing member 63 is provided with a substantially rectangular tube 75. The corners of the tube 75 are tapered. The tube 75 has rear bent pieces 76, 76 formed on the top and bottom and either sides of the rear end thereof; front extension pieces 81, 81 are formed on the top an 81 bottom of the front end; a left extension piece 81 is formed on the left side of the front end; and a right bent piece 81 is formed on the right side of the front end. The top and bottom and left rear bent pieces 76 have mounting holes 76a.

The mounting holes 61a formed above, below and to the left of the mounting plate 61 are aligned with the mounting holes 76a formed in the rear bent pieces 76 above, below, and to the left of the lower frame impact absorbing member 63, and the lower frame impact absorbing member 63 is spot welded or otherwise attached to the mounting plate 61. Therefore, the lower frame impact absorbing member 63 is attached to the left half position of the mounting plate 61, corresponding to the location of the front end 15a of the left front side frame 15.

The left impact absorber 21 is thus an assembly in which the side frame impact absorbing member 62 and the lower frame impact absorbing member 63 are attached to the mounting plate 61. The mounting plate 61 of the left impact absorber 21 is disposed on the entire area of the front surface 17a of the left oblong part 17.

Bolts 85 are inserted through the mounting holes 66a of the side frame impact absorbing member 62, the mounting holes 61a of the mounting plate 61, and the mounting holes 54a of the left front side frame 11, and are fastened together by nuts 86. The nuts 86 are weld nuts that are welded to the left and right upper mounting pieces 54, 54, the left and right lower mounting pieces 54, 54, and the left and right mounting pieces 54, 54.

Bolts 85 are inserted through the mounting holes 76a of the lower frame impact absorbing member 63, the mounting holes 61a of the mounting plate 61, and the mounting holes 54a of the lower frame 15, and these parts are fastened together by nuts 86.

The left impact absorber 21 is thereby attached to the entire area of the front surface 17a of the left oblong part 17.

As shown in FIG. 2, the left end 23a of a bumper beam 23 is inserted into the upper and lower front extension pieces 71, 71 of the side frame impact absorbing member 62, and the upper and lower front extension pieces 81, 81 of the lower frame impact absorbing member 63. The left end surface 23c of the left end part 23a comes in contact with the left front extension piece 81 of the lower frame impact absorbing member 63.

The upper and lower front extension pieces 71, 71 of the side frame impact absorbing member 62 are spot welded securely in place to the left end 23a by, and the left and right bent pieces 71, 71 of the side frame impact absorbing member 62 are spot welded securely in place to the left end 23a.

The upper and lower front extension pieces 81, 81 of the lower frame impact absorbing member 63 are spot welded securely in place to the left end 23a. The left front extension piece 81 and the right front bent piece 81 of the lower frame impact absorbing member 63 are spot welded securely in place to the left end 23a by spot welding.

The left end 23a of the bumper beam 23 is thereby spot-welded to the front end of the left impact absorbing member 21.

An assembly is thus formed by attaching the lower frame impact absorbing member 63 and the side frame impact absorbing member 62 of the left impact absorber 21 to the mounting plate 61. The assembly is then attached to the front surface 17a of the left oblong part 17 by a plurality of bolts 85. The left impact absorber 21 accordingly can be readily attached to the front surface 17a of the left oblong part 17 without intensive labor.

As shown in FIG. 4, the side slanted part 41 of the left front side frame 11 gradually slants at an angle of inclination θ1 from the substantially central part 11b in the longitudinal direction of the side reinforcement member 32 toward the font end 11a, as viewed from the outside in the width direction of the vehicle (left lower frame 15 side).

The lower slanted part 51 of the left lower frame 15 gradually slants at an angle of inclination θ2 from the substantially central part 15b in the longitudinal direction of the lower reinforcement member 45 toward the front end 15a, as viewed from the inside in the width direction of the vehicle (left front side frame 11 side).

The upper and lower overlapping parts 46b, 48b (see FIG. 3 for 48b) of the lower frame front end 15a are connected in area 11c of the side frame front end 11a, as viewed from the outside in the width direction of the vehicle. The side frame front end 11a and the lower frame front end 15a are connected in the width direction of the vehicle and arranged to form the left oblong part 17.

The side frame front end 11a and the lower frame front end 15a are thus directly connected. The interval between the slanted area 42 of the side slanted part 41 that faces the lower slanted part 51 and the slanted area 52 of the lower slanted part 51 that faces the side slanted part 41 thereby gradually narrows towards the front of the vehicle.

The slanted area 42 comprises the outer side 34a of the side reinforcement member 32 and the top wall part 34, and the outer side of the bottom wall part 36 (see FIG. 3).

The slanted area 52 comprises the inner side 46a of the lower reinforcement member 45 and the top wall part 46, and the inner side of the lower wall part 48 (see FIG. 3).

The interval between the slanted area 42 and the slanted area 52 gradually becomes narrower toward the front of the vehicle, whereby the slanted area 42 and the slanted area 52 form a V shape.

Accordingly, when a load is applied to the front surface of the left front side frame 11, some of the load is efficiently transmitted to the left lower frame 15 without a dramatic change in the transmission direction. The load received by the left front side frame 11 is therefore reduced. The rigidity of the left front side frame 11 accordingly does not have to be increased more than necessary, and a reduction in weight can be achieved.

On the other hand, an inner wall part 35 of the left front side frame 11 extends substantially parallel to the longitudinal direction of the vehicle body. An outer wall part 47 of the left lower frame 15 also extends substantially parallel to the longitudinal direction of the vehicle body. When a load is applied to the left front side frame 11 and the left lower frame 15 from the front thereof, the applied load can be favorably transmitted by the left front side frame 11 and the left lower frame 15 toward the rear of the vehicle.

The left impact absorber 21 is formed in an oblong shape, whereby the width W thereof can be substantially ensured. The left impact absorber 21 is thereby unable to bend in the transverse direction (direction of vehicle width), and rigidity is increased. The bumper beam 23, which is attached to the left impact absorber 21, is thereby used as a member for reinforcing the left front side frame 11 and the left lower frame 15.

The bumper beam 23 thus serves as a reinforcement member for both the left front side frame 11 and the left lower frame 15, whereby the reinforcement member that is normally used can be removed.

The function of the front body structure 10 will be described next with reference to FIGS. 5A and 5B.

As shown in FIG. 5A, when a load F1 is applied to the left end 23a of the bumper beam 23, a load F2 is transmitted to the left front side frame 11 via the side frame impact absorbing member 62 of the left impact absorber 21, and a load F3 is transmitted to the left lower frame 15 via the lower frame impact absorbing member 63. Therefore, the load F1 applied to the left end 23a of the bumper beam 23 is satisfactorily dispersed to the left front side frame 11 and the left lower frame 15. The load transmitted to the front side frame is thus reduced, the rigidity of the front side frame does not have to be increased more than necessary, and a reduction in weight can be achieved.

As shown in FIG. 5B, when a load F4 is applied to the area of the left end 23a of the bumper beam 23 that faces the side frame impact absorbing member 62, most of the load F4 is transmitted to the side frame impact absorbing member 62 and less to the lower frame impact absorbing member 63. The slanted area 42 and the slanted area 52 form a substantial V shape. Therefore, of the load F4 transmitted from the side frame impact absorbing member 62 to the front end 11a of the left front side frame 11, the load F5 is efficiently transmitted to the left lower frame 15 without any dramatic change in the transmission direction, and the load F6 received by the left front side frame 11 can be reduced. Therefore, the rigidity of the left front side frame 11 does not have to be increased more than necessary.

Figure 6:
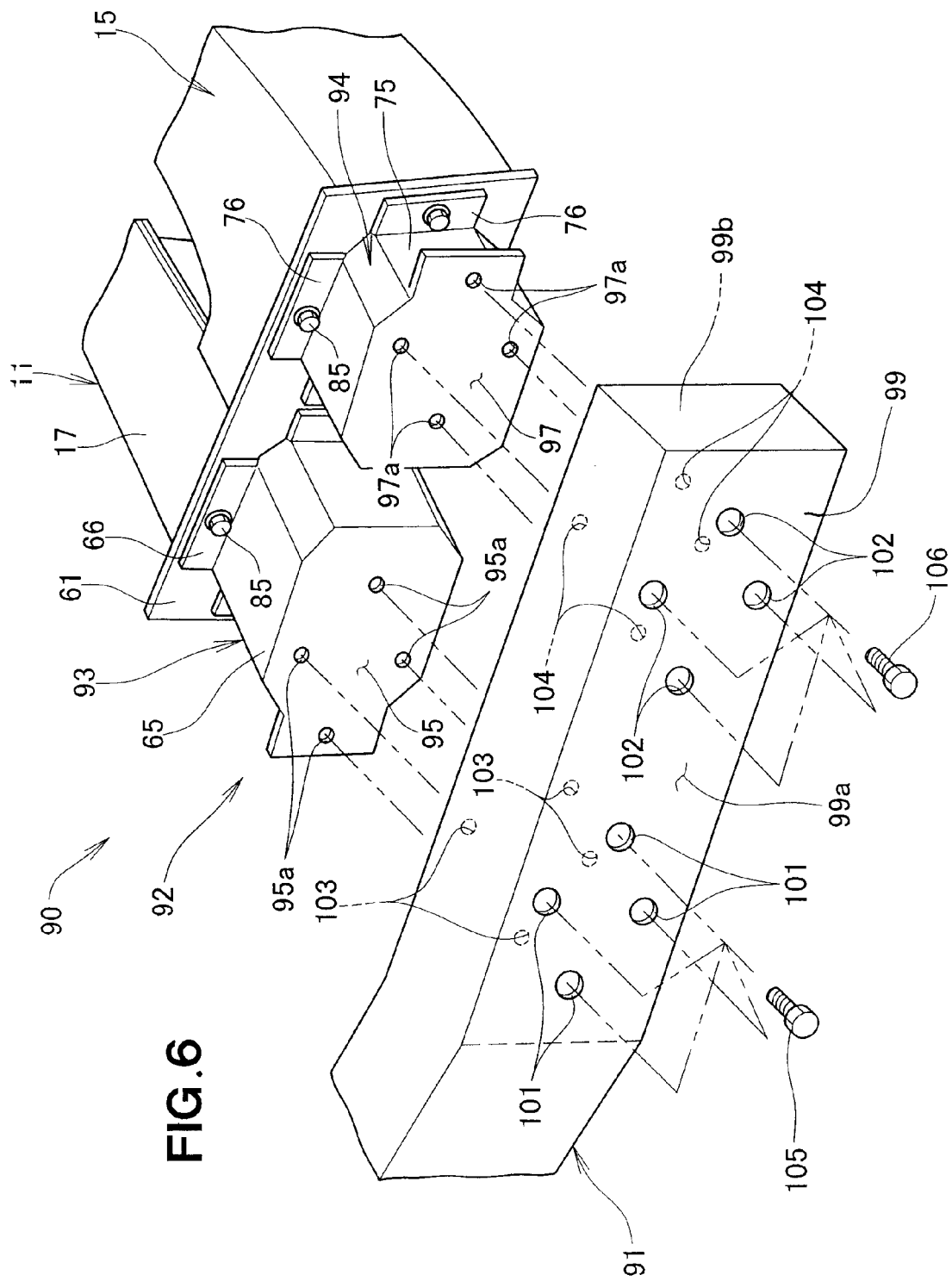
FIG. 6 is an exploded perspective view showing a front body structure according to a second embodiment of the present invention.
Figure 7:
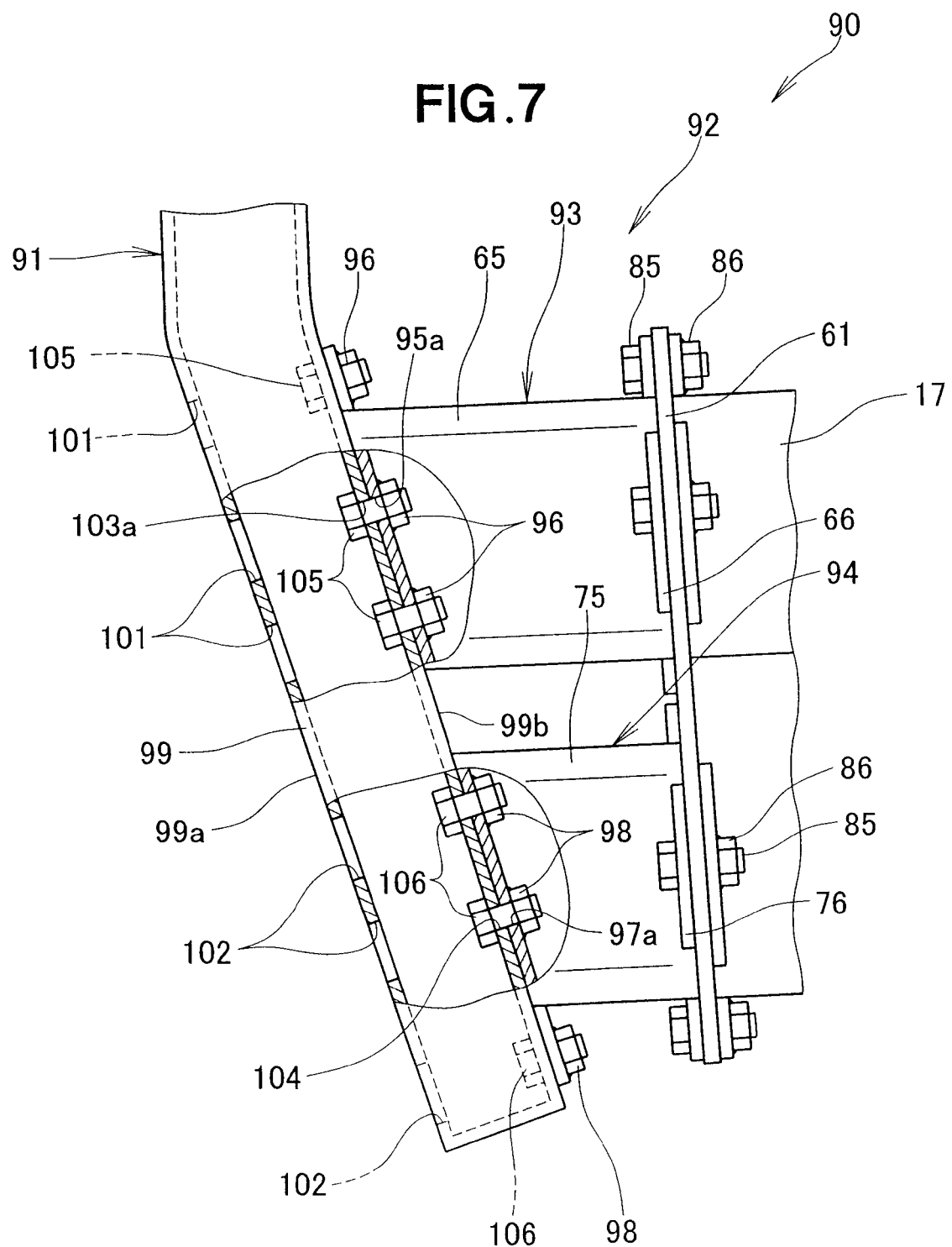
FIG. 7 is a top plan view showing, partially in section, a part of the front body structure according to the second embodiment.
Figure 8:
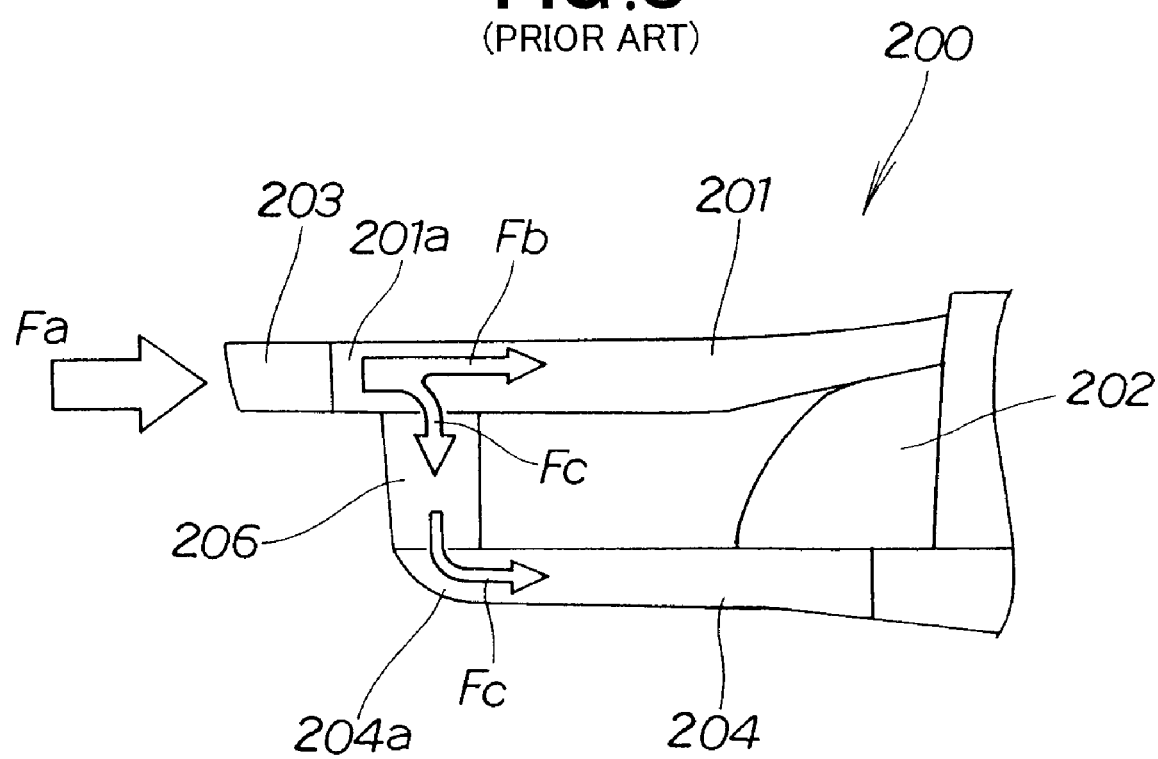
FIG. 8 is a schematic view showing a conventional front body structure.

Next, a front body structure 90 of a second embodiment will be described with reference to FIGS. 6 and 7. The same numerical symbols are used for members of the front body structure 90 of the second embodiment that are the same as or similar to members of the front body structure 10 of the first embodiment, and a description thereof is omitted.

In the front body structure 90 of the second embodiment, a bumper beam 91 is bolted to left and right impact absorbers 92 (since the impact absorbers have right-left symmetry, the right impact absorber has been omitted in the drawings). The remainder of the structure is similar to the front body structure 10 of the first embodiment, and a description thereof is omitted.

As with the left impact absorber 21 of the first embodiment shown in FIG. 3, the left impact absorber 92 is provided with a mounting plate 61 attached by bolts to the entire front surface 17a of the left oblong part 17 (see FIG. 3); and a side frame impact absorbing member 93 and a lower frame impact absorbing member 94 attached to the mounting plate 61.

A plurality of mounting holes 95a is formed in the front end 95 of the tube 65 of the side frame impact absorbing member 93. Nuts 96 (see FIG. 7) are welded concentrically with respect to the mounting holes 95a. The remainder of the structure is similar to the side frame impact absorbing member 62 of the first embodiment.

A plurality of mounting holes 97a is formed in the front end 97 of the tube 75 of the lower frame impact absorbing member 94. Nuts 98 (see FIG. 7) are welded concentrically with regard to the mounting holes 97a on the lower impact absorbing member. The remainder of the structure is similar to the lower frame impact absorbing member 63 of the first embodiment.

A plurality of openings 101, 102 is formed in a front wall part 99a of a left end 99 of the bumper beam 91, and a plurality of mounting holes 103, 104 is formed in a rear wall part 99b of the left end 99. The remainder of the structure of the bumper beam is similar to the bumper beam 23 of the first embodiment.

The openings 101 and the mounting holes 103 are concentrically disposed. The openings 102 and the mounting holes 104 are also concentrically disposed.

Bolts 105 are inserted through the openings 101 into the mounting holes 103 and the mounting holes 95a, and are fastened using nuts 96. Bolts 106 are inserted through the openings 102 into the mounting holes 104 and the mounting holes 97a, and are fastened using nuts 98. Specifically, bolts 105, 106 and nuts 96, 98 are used to attach the left end 99 of the bumper beam 91 to the front end 95 of the side frame impact asborbing member 93 and the front end 97 of the lower frame impact absorbing member 94.

The front end part of the left impact absorber 92 comprises the front end 95 of the side frame impact absorbing member 93 and the front end 97 of the lower frame impact absorbing member 94.

The front body structure 90 of the second embodiment enables the same effects exhibited by the front body structure 10 of the first embodiment to be obtained. Moreover, assembly can be facilitated due to the bumper beam 91 being bolted to the left impact absorber 92. Furthermore, the materials used for the bumper beam 91 and the left impact absorber 92 can be modified as desired, and greater design latitude can be obtained.

For example, it is possible to form the left impact absorber 92 out of steel, and the bumper beam 91 out of aluminum, which allows weight to be reduced.

Descriptions were provided in the above examples wherein the left impact absorber 21 or 92 was assembled from two members, namely a side frame impact absorbing member 62, 93 and a lower frame impact absorbing member 63, 94. However, this structure is not provided by way of limitation; an impact absorber made of a single member may also be used.

Obviously, various minor changes and modifications of the present invention are possible in light of the above teaching. It is therefore to be understood that within the scope of the appended claims the invention may be practiced otherwise than as specifically described.

What is claimed is:

1. An automobile front body structure, comprising:
   a front side frame extending in a longitudinal direction of the vehicle body;
   a front pillar disposed above a rear part of the front side frame; and
   a lower frame that extends from a bottom end of the front pillar toward a front of the vehicle body and is disposed on an outside of the front side frame as viewed in a width direction of the vehicle, wherein
   a front end of the front side frame and a front end of the lower frame are arranged in parallel in the width direction of the vehicle, and the front ends are connected to each other.

2. The automobile front body structure of claim 1, wherein an oblong part extending in the width direction of the vehicle is formed using the connected front ends, an impact absorber is provided along a front surface of the oblong part, and a bumper beam is attached to the impact absorber.

3. The automobile front body structure of claim 2, wherein the impact absorber comprises:
   a mounting plate attached to the front surface of the oblong part;
   a side frame impact absorbing member attached to the mounting plate, and provided in front of the front side frame; and
   a lower frame impact absorbing member attached to the mounting plate, and provided in front of the lower frame, and wherein an assembly having the mounting plate, the side frame impact absorbing member, and the lower frame impact absorbing member is attached to the front surface of the oblong part.

4. The automobile front body structure of claim 1, wherein opposing side surfaces of the front side frame and the lower frame are inclined at an angle of θ1 and θ2, and the front side frame and lower frame increase in width so as to come closer to each other toward the front ends thereof.

5. The automobile front body structure of claim 2, wherein the impact absorber extends over an entire surface area of the oblong part front surface.

6. The automobile front body structure of claim 3, wherein the assembly is attached to the oblong part front surface with a plurality of bolts.

* * * * *